US009049630B2

(12) United States Patent
Chin et al.

(10) Patent No.: US 9,049,630 B2
(45) Date of Patent: Jun. 2, 2015

(54) FACILITATING BATON HANDOVER IN MULTI-CARRIER TD-SCDMA COMMUNICATIONS SYSTEMS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 270 days.

(21) Appl. No.: 12/883,958

(22) Filed: Sep. 16, 2010

(65) Prior Publication Data

US 2011/0243095 A1 Oct. 6, 2011

Related U.S. Application Data

(60) Provisional application No. 61/320,097, filed on Apr. 1, 2010.

(51) Int. Cl.
*H04W 36/00* (2009.01)
*H04W 36/06* (2009.01)
*H04W 36/16* (2009.01)

(52) U.S. Cl.
CPC .............. *H04W 36/06* (2013.01); *H04W 36/16* (2013.01)

(58) Field of Classification Search
None
See application file for complete search history.

(56) References Cited

U.S. PATENT DOCUMENTS

| 6,208,631 | B1 * | 3/2001 | Kim .............................. 370/332 |
| 8,190,157 | B2 * | 5/2012 | Zhu et al. ...................... 455/436 |
| 8,340,661 | B2 * | 12/2012 | Boixadera et al. ......... 455/426.1 |
| 8,681,771 | B2 * | 3/2014 | Zhang et al. ................... 370/350 |
| 2005/0141452 | A1 * | 6/2005 | Vancraeynest ................ 370/329 |
| 2006/0252428 | A1 * | 11/2006 | Agashe et al. ................ 455/436 |
| 2008/0101311 | A1 * | 5/2008 | Bernhard et al. ............. 370/342 |
| 2009/0122730 | A1 * | 5/2009 | Yang et al. .................... 370/280 |

FOREIGN PATENT DOCUMENTS

| CN | 1221304 A | 6/1999 |
| CN | 1398079 A | 2/2003 |
| CN | 1878392 A | 12/2006 |
| EP | 0873034 A2 | 10/1998 |

OTHER PUBLICATIONS

Chen et al., "China's Perspectives on 3G Mobile COmmunications and Beyond: TD-SCDMA Technology", Apr. 2012, IEEE Wireless Communication, pp. 48-59.*
Xie et al., "TD-SCDMA Handover Method and Time-Delay Performance Analysis", Jun. 2005, www.tdscdma-forum.org, pp. 1-8.*

(Continued)

*Primary Examiner* — Steve Young
(74) *Attorney, Agent, or Firm* — Kristine U. Ekwueme

(57) ABSTRACT

Handover processes in multi-carrier carrier time division-synchronous code division multiple access (TD-SCDMA) systems include a two-step handover process. When handover of a user equipment is warranted, a hard handover is performed within a source cell of the system from a first frequency to a second frequency. A baton handover is then performed from the second frequency at the source cell to the second frequency at a target cell. In another aspect, a user equipment receives an assignment of an uplink time slot at a target cell that was selected to prevent the uplink time slot from being proximal to a downlink time slot of a source cell. The user equipment then performs the inter-frequency baton handover using the uplink time slot.

28 Claims, 10 Drawing Sheets

(56) References Cited

OTHER PUBLICATIONS

Chen et al., "China's Perspectives on 3G Mobile COmmunications and Beyond: TD-SCDMA Technology", Apr. 2012, IEEE.*
Xie et al., "TD-SSCDMA Handover Method and Time-Delay Performance Analysis", Jun. 2005, www.tdscdma-forum.org, pp. 1-8.*
Bo Li, et al., "Recent advances on TD-SCDMA in China," IEEE Communications Magazine, IEEE Service Center, 2005, vol. 43, pp. 30-37.
Chen et al., "TD-SCDMA handover method and time-delay performance analysis", www.tdscdma-forum.org Jun. 22, 2005, pp. 1-8. XP002652647, Retrieved from the Internet: URL:www.tdscdma-forum.org/EN/pdfword/20056 1413292145655.doc [retrieved on Jul. 21, 2011] paragraphs [abstract]—[01.2].
Chen, H et al., "China'S Perspectives on 3G Mobile Communications and Beyond: TDSCDMA Technology", IEEE Personal Communications, IEEE Communications Society, US LNKD-DOI:10.1109/MWC.2002.998525! vol. 9, No. 2, Apr. 1, 2002, pp. 48-59, XP011093854, ISSN: 1070-9916.
International Search Report and Written Opinion—PCT/US2011/031019—ISA/EPO—Aug. 8, 2011.
Yuan Jinshua et al., "A MIH Based Architecture for WiMAX and TD-SCDMA Interworking", Networks Security Wireless Communications and Trusted Computing, 2009. NSWCTC '09. International Conference on, IEEE, Piscataway, NJ, USA, Apr. 25, 2009, pp. 136-139, XP031452629. ISBN: 978-1-4244-4223-2 figure 3.
Taiwan Search Report—TW100111613—TIPO—Sep. 23, 2013.

* cited by examiner

FACILITATING BATON HANDOVER IN MULTI-CARRIER TD-SCDMA COMMUNICATIONS SYSTEMS

CROSS REFERENCE TO RELATED APPLICATION

This application claims the benefit of U.S. provisional patent application No. 61/320,097 filed Apr. 1, 2010, in the names of CHIN et al., the disclosure of which is expressly incorporated herein by reference in its entirety.

BACKGROUND

1. Field

Aspects of the present disclosure relate, in general, to wireless communication systems, and more particularly, to facilitating baton handover in multi-carrier TD-SCDMA communications systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd generation partnership project (3GPP). The UMTS, which is the successor to global system for mobile communications (GSM) technologies, currently supports various air interface standards, such as wideband-code division multiple access (W-CDMA), time division-code division Multiple access (TD-CDMA), and time division-synchronous code division multiple access (TD-SCDMA). For example, China is pursuing TD-SCDMA as the underlying air interface in the UTRAN architecture with its existing GSM infrastructure as the core network. The UMTS also supports enhanced 3G data communications protocols, such as high speed downlink packet data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

In one aspect of the disclosure, a method for implementing an inter-frequency handover in a multi-carrier TD-SCDMA system includes performing a hard handover of a user equipment within a source cell of the multi-carrier TD-SCDMA system from a first frequency to a second frequency and performing a baton handover of the user equipment from the second frequency at the source cell to the second frequency at a target cell of the multi-carrier TD-SCDMA system.

In another aspect of the disclosure, a user equipment for implementing an inter-frequency handover in a multi-carrier TD-SCDMA system includes means for performing a hard handover of a user equipment within a source cell of the multi-carrier TD-SCDMA system from a first frequency to a second frequency and means for performing a baton handover of the user equipment from the second frequency at the source cell to the second frequency at a target cell of the multi-carrier TD-SCDMA system.

In yet another aspect of the disclosure, a computer program product includes a computer-readable medium having computer code recorded thereon. The computer code includes code that performs a hard handover of a user equipment within a source cell of the multi-carrier TD-SCDMA system from a first frequency to a second frequency and code that performs a baton handover of the user equipment from the second frequency at the source cell to the second frequency at a target cell of the multi-carrier TD-SCDMA system.

In an aspect of the disclosure, a user equipment for wireless communication in a multi-carrier TD-SCDMA system includes at least one processor and a memory coupled to the processor(s). The processor is configured to perform a hard handover of a user equipment within a source cell of the multi-carrier TD-SCDMA system from a first frequency to a second frequency and to perform a baton handover of the user equipment from the second frequency at the source cell to the second frequency at a target cell of the multi-carrier TD-SCDMA system.

In another aspect of the disclosure, a method for implementing an inter-frequency baton handover in a multi-carrier TD-SCDMA system includes receiving, at a user equipment, an assignment of an uplink time slot at a target cell of the multi-carrier TD-SCDMA system. The uplink time slot is not proximal to a downlink time slot of a source cell of the multi-carrier TD-SCDMA system. The method also includes performing the inter-frequency baton handover of the user equipment using the uplink time slot.

In an aspect of the disclosure, a user equipment in a multi-carrier TD-SCDMA system includes means, executable by the user equipment, for receiving an assignment of an uplink time slot at a target cell of the multi-carrier TD-SCDMA system. The uplink time slot is not proximal to a downlink time slot of a source cell of the multi-carrier TD-SCDMA system. The user equipment also includes means for performing the inter-frequency baton handover of the user equipment using the uplink time slot.

In an aspect of the disclosure, a computer program product including a computer-readable medium has computer code recorded thereon. The computer code includes code that receives, at a user equipment, an assignment of an uplink time slot at a target cell of the multi-carrier time division-synchronous code division multiple access (TD-SCDMA) system. The uplink time slot is not proximal to a downlink time slot of a source cell of the multi-carrier TD-SCDMA system. The computer code also includes code that performs the inter-frequency baton handover of the user equipment using the uplink time slot.

In an aspect of the disclosure, a user equipment for wireless communication in a multi-carrier TD-SCDMA system includes at least one processor and a memory coupled to the processor. The processor is configured to receive, at a user equipment, an assignment of an uplink time slot at a target cell of the multi-carrier TD-SCDMA system. The uplink time slot is not proximal to a downlink time slot of a source cell of the multi-carrier TD-SCDMA system. The processor is also configured to perform the inter-frequency baton handover of the user equipment using the uplink time slot.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
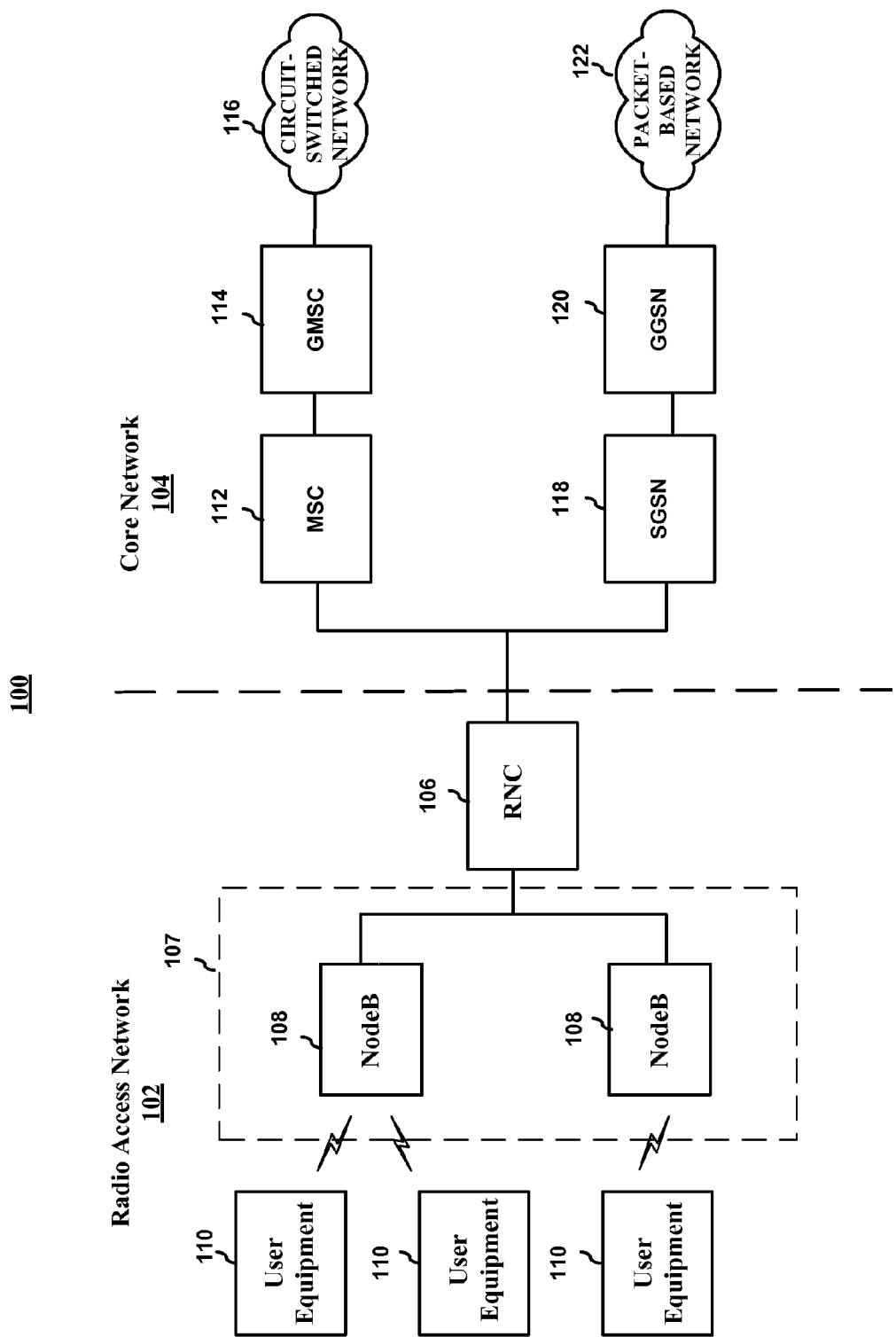
FIG. 1 is a block diagram illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of radio network subsystems (RNSs), such as an RNS 107, each controlled by a radio network controller (RNC), such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces, such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for general packet radio service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum direct-sequence code division multiple access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
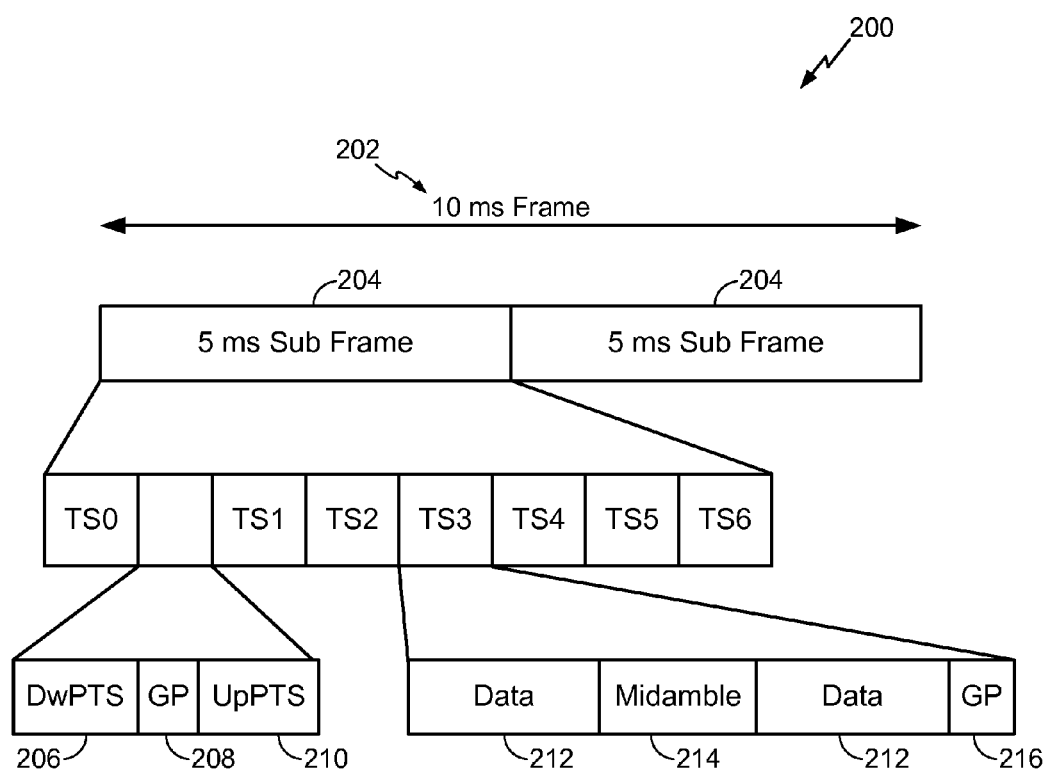
FIG. 2 shows a frame structure for a TD-SCDMA carrier.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206 (also known as the downlink pilot channel (DwPCH)), a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
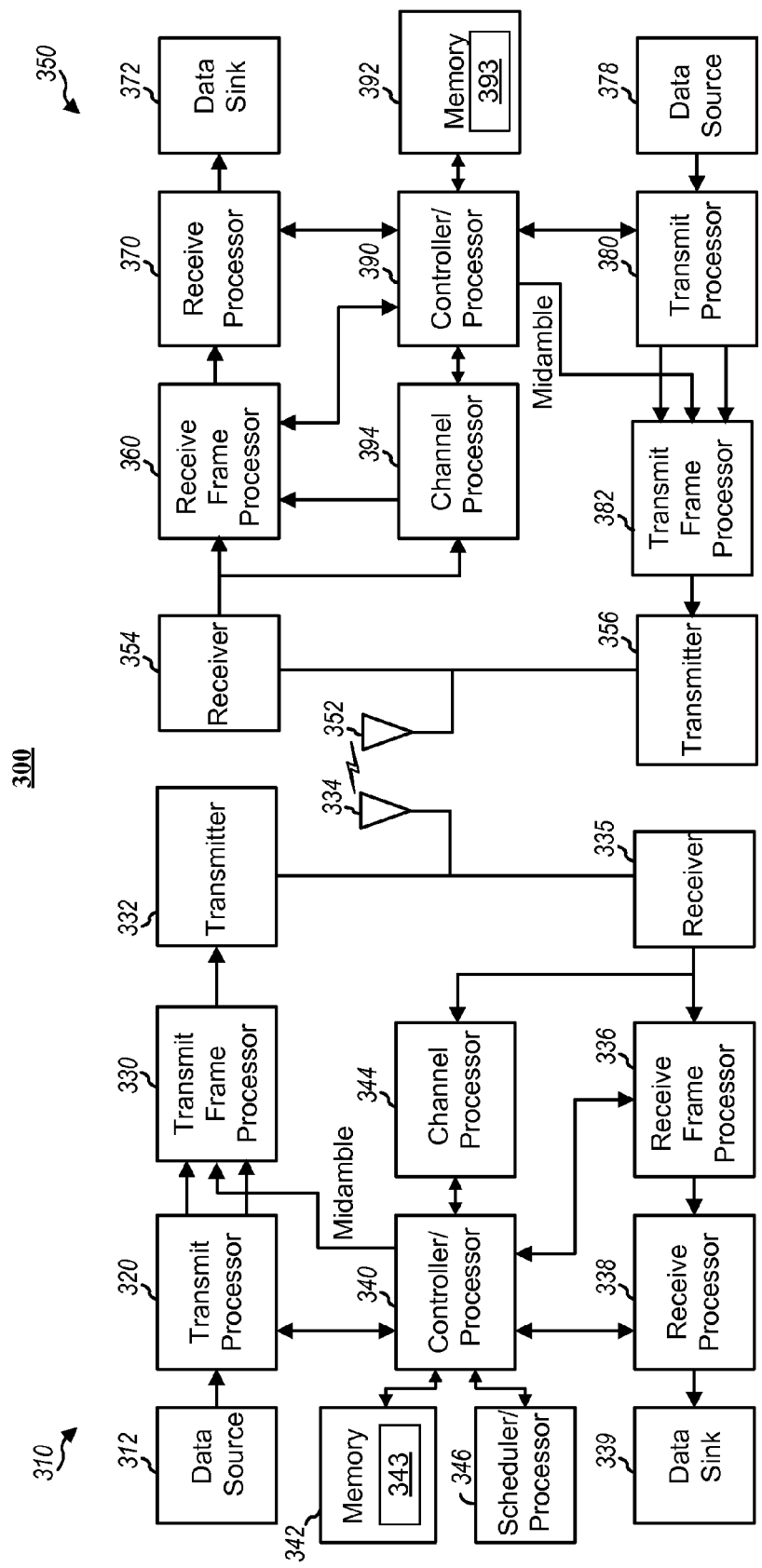
FIG. 3 is a block diagram of a Node B in communication with a user equipment in a radio access network.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard, pointing device, track wheel, and the like). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the smart antennas 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor 340, respectively. If some of the frames were unsuccessfully decoded by the receive processor 338, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. For example, the memory 342 of the Node B 310 includes a handover module 343, which, when executed by the controller/processor 340, the handover module 343 configures the Node B to perform handover procedures from the aspect of scheduling and transmission of system messages to the UE 350 for implementing a handover from a source cell to a target cell. The UE may also have a handover module 393 stored in its memory 392 which configures the UE to perform handover procedures with one or more Node Bs. A scheduler/processor 346 at the Node B 310 may be used to allocate resources to the UEs and schedule downlink and/or uplink transmissions for the UEs not only for handovers, but for regular communications as well.

Figure 4:
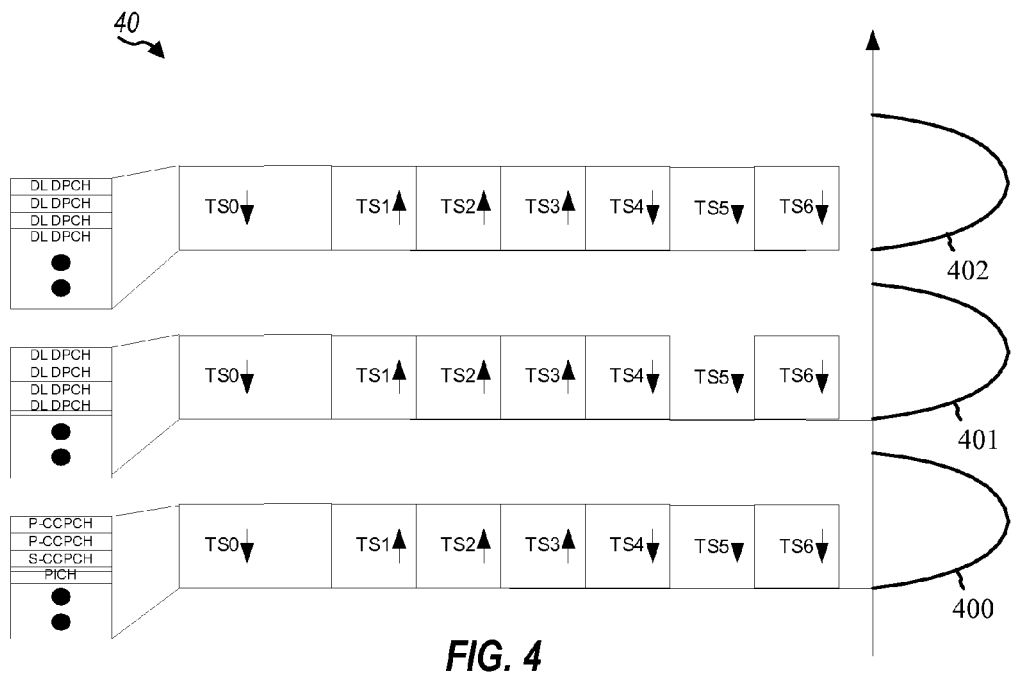
FIG. 4 is a block diagram illustrating carrier frequencies in a multi-carrier TD-SCDMA communication system.

In order to provide more capacity, the TD-SCDMA system may allow multiple carrier signals or frequencies. Assuming that N is the total number of carriers, the carrier frequencies may be represented by the set $\{F(i), i=0, 1, \ldots, N-1\}$, where the carrier frequency, F(0), is the primary carrier frequency and the rest are secondary carrier frequencies. For example, a cell can have three carrier signals whereby the data can be transmitted on some code channels of a time slot on one of the three carrier signal frequencies. FIG. 4 is a block diagram illustrating carrier frequencies 40 in a multi-carrier TD-SCDMA communication system. The multiple carrier frequencies include a primary carrier frequency 400 (F(0)), and two secondary carrier frequencies 401 and 402 (F(1) and F(2)). In such multi-carrier systems, the system overhead may be transmitted on the first time slot (TS0) of the primary carrier frequency 400, including the primary common control physical channel (P-CCPCH), the secondary common control physical channel (S-CCPCH), the pilot indicator channel (PICH), and the like. The traffic channels may then be carried on the remaining time slots (TS1-TS6) of the primary carrier frequency 400 and on the secondary carrier frequencies 401 and 402. Therefore, in such configurations, a UE will receive system information and monitor the paging messages on the primary carrier frequency 400 while transmitting and receiving data on either one or all of the primary carrier frequency 400 and the secondary carrier frequencies 401 and 402.

It should be noted that the DwPTS and UpPTS may be configured on the primary carrier frequency 400 and the secondary carrier frequencies 401 and 402. However, random access procedure may be performed with the primary carrier frequency 400, while the handover uplink synchronization procedure may be performed with either or both of the primary carrier frequency 400 and the secondary carrier frequencies 401 and 402.

Figures 5A, 5B, 5C:
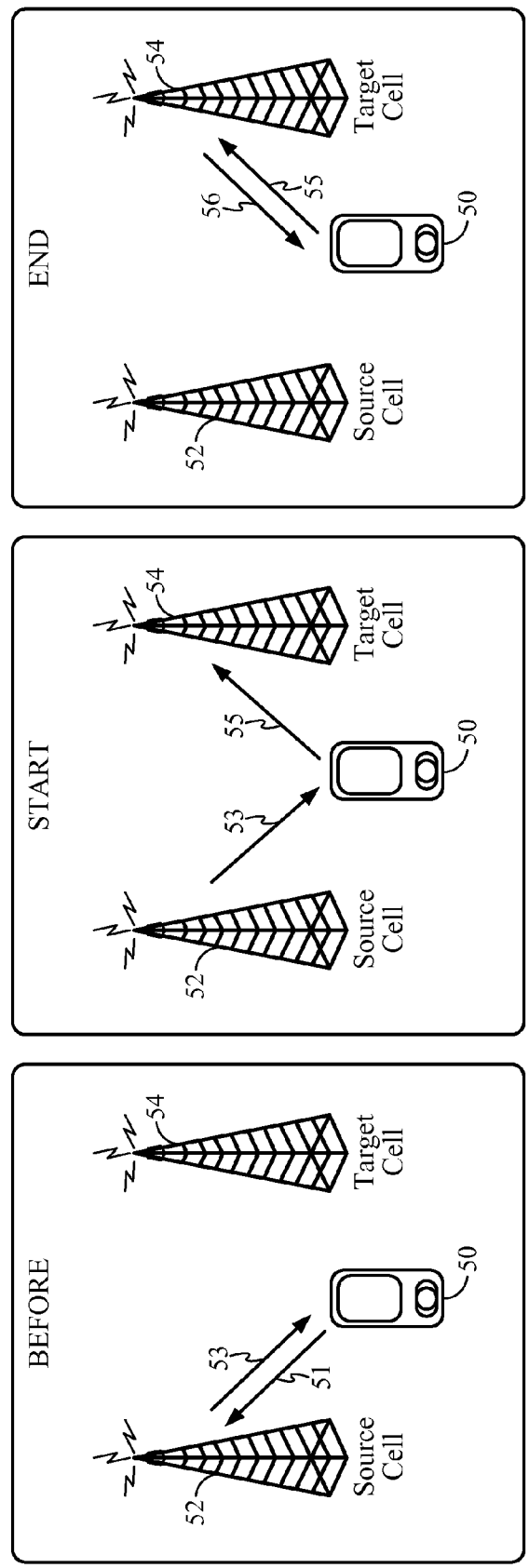
FIGS. 5A-5C illustrate a baton handover in "before," "start" and "end" stages.

In general, there are two kinds of handover in TD-SCDMA systems: hard handover and baton handover. In hard handover, the UE switches both downlink and uplink connections simultaneously to the target cell. In baton handover, the UE first switches the uplink connection to the target cell and then switches the downlink connection to the target cell. The baton handover allows the target cell to acquire the uplink connection, measure timing and power and then configure beam forming before the UE switches the downlink connection. FIGS. 5A-5C illustrate a baton handover in "before," "start" and "end" stages. During a baton handover, the user equipment 50 first switches an uplink 51 with a source cell 52 to an uplink 55 with a target cell 54. After receiving the uplink 55, the target cell 54 begins preparation for handling communication with the user equipment 50. Once the uplink 55 is properly operating and the target cell 54 has made the preparation for the user equipment 50, the user equipment 50 switches a downlink 53 from the source cell 52 to a downlink 56 from the target cell 54. The two steps in baton handover allow the target cell 54 to acquire the uplink 55, measure timing and power and configure beam forming before the user equipment 50 switches the downlink 53.

In a multi-carrier system, however, the carrier frequency of the source cell 52 may be different than the carrier frequency of the target cell 54. Moreover, the hardware of the user equipment, such as the user equipment 50, may only be capable of transmitting and receiving on one single carrier frequency. This is especially true when the downlink and uplink time slots allocated for a call are continuous in the subframe, e.g., TS3 and TS4 (as illustrated, for example, in FIG. 4). Therefore, in a multi-carrier TD-SCDMA system, when the new link at the target cell would be on a different carrier frequency from that of the link at the source cell, then a baton handover may not be allowable.

Figure 6:
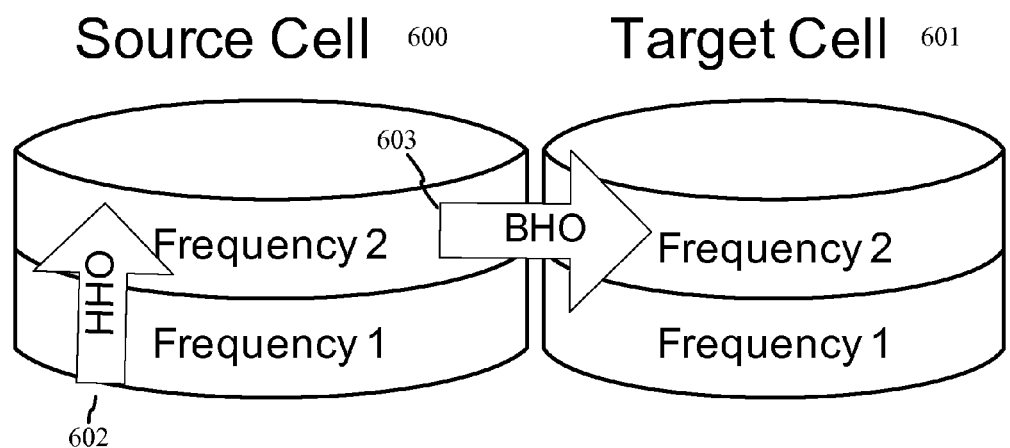
FIG. 6 is a block diagram conceptually illustrating a handover scheme configured according to one aspect of the present teachings.

FIG. 6 is a block diagram conceptually illustrating a handover scheme configured according to one aspect of the present teachings. A user equipment (not shown) is coupled with a source cell 600 and will be transitioning to communication with a target cell 601 after a handover. The source cell 600 and target cell 601 are each multi-carrier systems which include at least the illustrated Frequency 1 and Frequency 2. The user equipment begins communicating with the source cell 600 using the carrier frequency, Frequency 1. However, on handover, the communication with the target cell 601 is to be conducted using the carrier frequency, Frequency 2. In order to safely and efficiently complete handover to the target cell 601, the handover process begins with a hard handover (HHO) 602. In the hard handover 602, the uplink and downlink connections are simultaneously switched from Frequency 1 to Frequency 2. This hard handover 602 occurs within the same cell, i.e., the source cell 600. Therefore, it is a safer transition because there is less complexity without initiating communication with a completely new cell, i.e., the target cell 601.

With the hard handover 602 completed, the user equipment is still communicating with the source cell 600, but now is using the new carrier frequency, Frequency 2. A baton handover (BHO) 603 may now by employed in handing over the user equipment communication between the source cell 600 and the target cell 601. Thus, during the baton handover 603, for a period, the downlink communication will be with the source cell 600 using Frequency 2, while the uplink communication will be with the target cell 601 using Frequency 2 also. The user equipment, therefore, puts less of a constraint on its hardware capabilities by not trying to maintain downlink communication with the source cell 600 on Frequency 1, while communicating in the uplink direction with the target cell 601 using Frequency 2. The handover between the source cell 600 and the target cell 601 is completed safely and efficiently.

Figure 7:
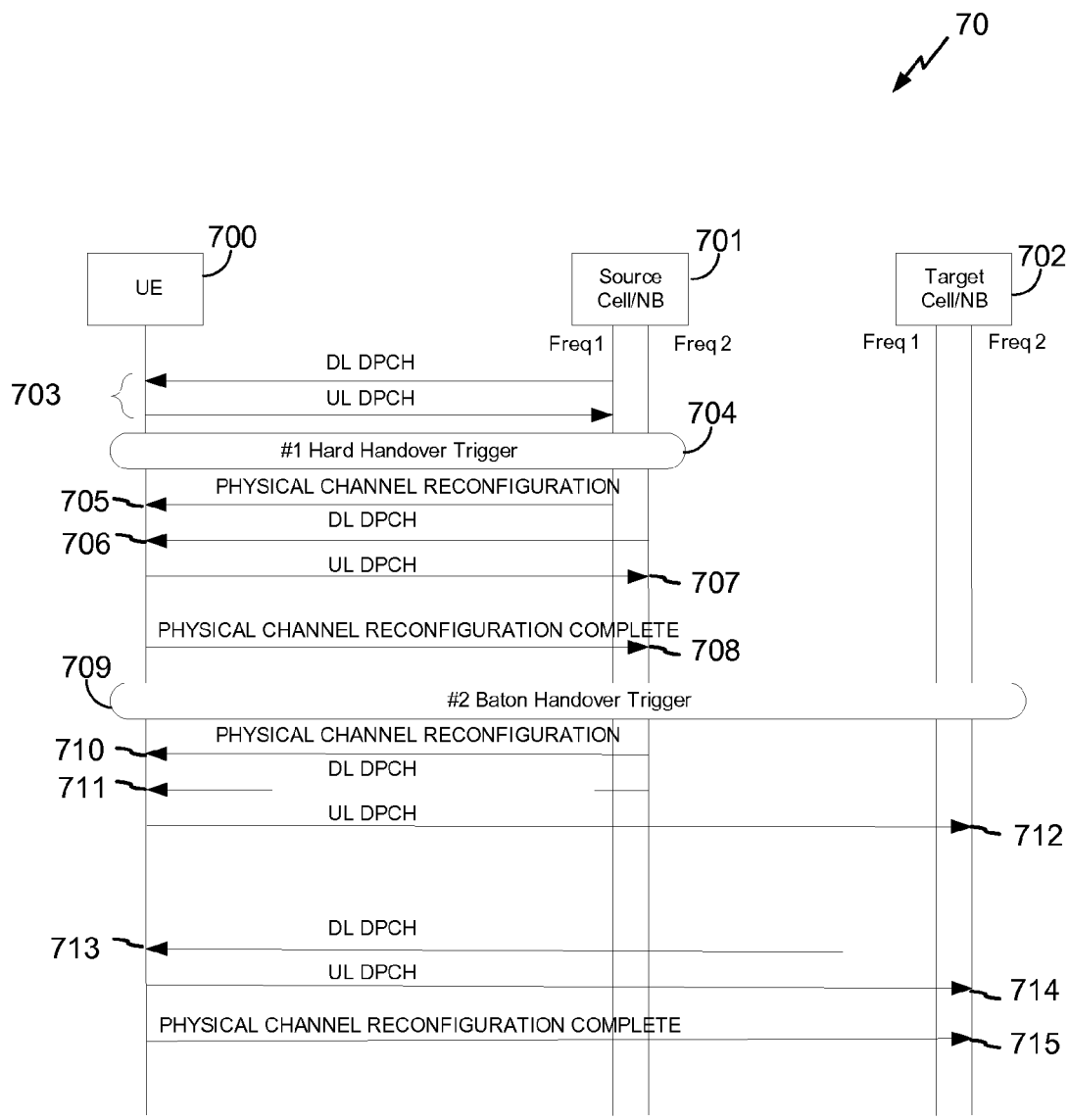
FIG. 7 is a call flow diagram illustrating a handover configured according to one aspect of the present teachings.

FIG. 7 is a call flow diagram illustrating a handover configured according to one aspect of the present teachings. A user equipment 700 is in communication with a source cell/Node B 701 in a multi-carrier TD-SCDMA communications system 70. The user equipment 700 is to be handed over to a target cell/Node B 702. At position 703 in the call flow, the user equipment 700 communicates in both uplink and downlink directions with the source cell/Node B 701 and the first frequency, Freq 1. At position 704 in the call flow, a hard handover is triggered in a Physical Channel Reconfiguration message 705. With this hard handover triggered, the uplink and downlink communications are simultaneously switched at position 706 and 707 to the second frequency, Freq 2. A Physical Channel Reconfiguration Complete message 708 is then transmitted to the source cell/Node B 701.

At position 709 in the call flow, a baton handover is now triggered with another Physical Channel Reconfiguration message 710. With the baton handover triggered, the downlink communication, at position 711, remains with the source cell/Node B 701 on the Freq 2. However, the uplink communication, at position 712, is switched to the target cell/Node B 702 also using the second frequency, Freq 2. Once the preparations have been completed to finish the handover, the downlink communication, at position 713, is switched to the target cell/Node B 702 using the second frequency, Freq 2, to match the uplink communication, at position 714. A Physical Channel Reconfiguration Complete message 715 is then transmitted to the target cell/Node B 702 to signal the successful completion of the handover from the source cell/Node B 701 to the target cell/Node B 702.

Figure 8:
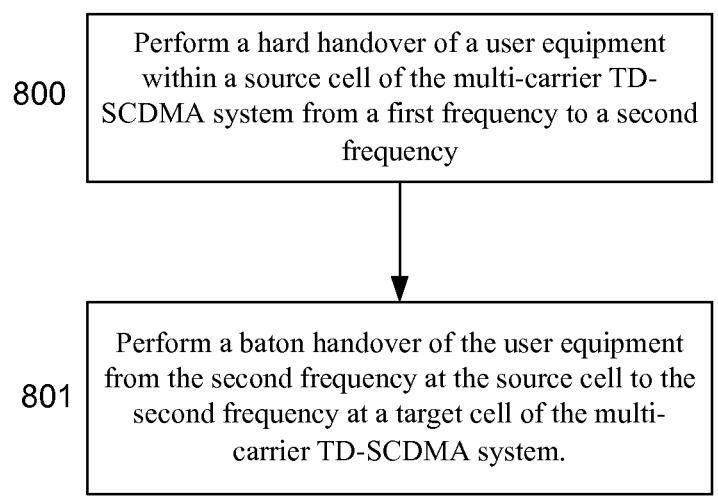
FIG. 8 is a functional block diagram illustrating example blocks executed to implement one aspect of the present teachings.

FIG. 8 is a functional block diagram illustrating example blocks executed to implement one aspect of the present teachings. In block 800, a hard handover of a user equipment is performed within a source cell of the multi-carrier TD-SCDMA system from a first frequency to a second frequency. A baton handover of the user equipment is then performed, in block 801, from the second frequency at the source cell to the second frequency at a target cell of the multi-carrier TD-SCDMA system.

Figure 9A:
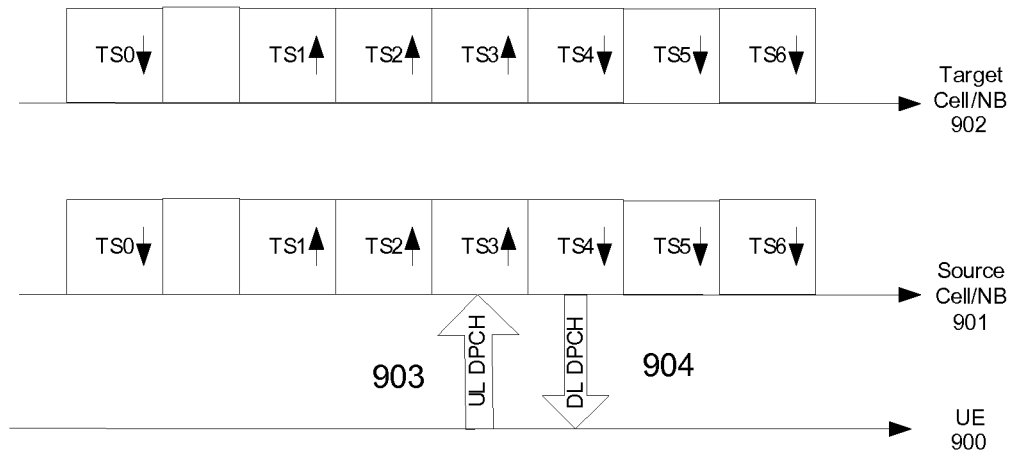
FIG. 9A is a block diagram illustrating frame structures of a source cell/Node B in communication with a user equipment and a target cell/Node B slated for handover.

In addition to performing the handover using a two-step hard handover/baton handover process, additional aspects of the present teachings provide for a handover to be completed using a one-step baton handover process. FIG. 9A is a block diagram illustrating frame structures of a source cell/Node B 901 in communication with a user equipment 900 and a target cell/Node B 902 slated for handover. The communications illustrated in FIG. 9A occur prior to baton handover. In this configuration of the communication, the uplink communication 903 is scheduled for TS3, while the downlink communication 904 is scheduled for the consecutive time slot, TS4. If the baton handover were to commence with the uplink communication 903 occurring at a different frequency with the target cell/Node B 902, the user equipment 900 may not be capable of switching frequencies quickly enough to accommodate for the uplink and downlink communications at different frequencies in consecutive time slots.

Figure 9B:
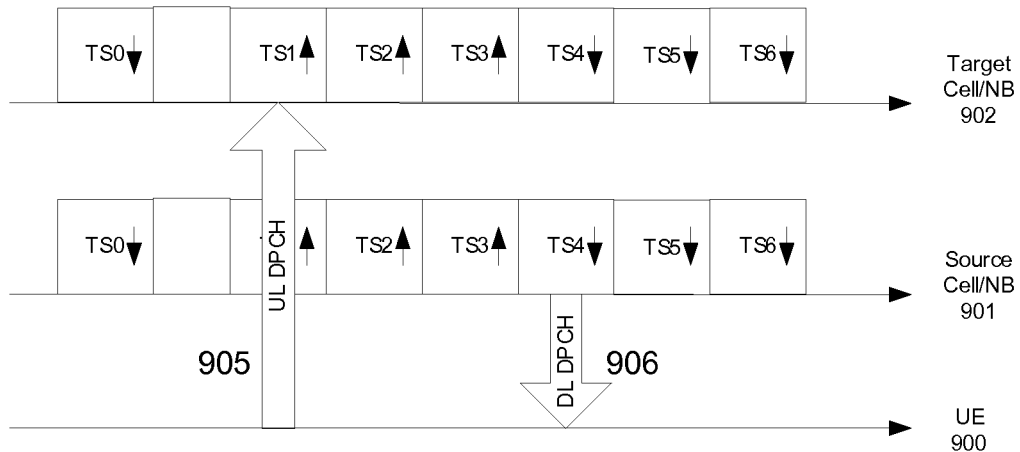
FIG. 9B is a block diagram illustrating frame structures of the source cell/Node B and the target cell/Node B configured according to one aspect of the present teachings.

FIG. 9B is a block diagram illustrating frame structures of the source cell/Node B 901 and the target cell/Node B 902 configured according to one aspect of the present teachings. When the baton handover is commenced, the uplink communication 905 is scheduled for a new timeslot, TS1, instead of the originally scheduled timeslot, TS3. The source cell/Node B 901 transmits a Physical Channel Reconfiguration message to the user equipment 900 which schedules the uplink communication 905 to a timeslot that prevents scheduling of the downlink communication 906 in an adjacent, proximal timeslot. Logic within the source cell/Node B 901 determines what the scheduling would be on the baton handover and, if a downlink communication schedule would result in an adjacent, proximal timeslot, a new timeslot for the downlink communication 906 is assigned that is non-proximal to the uplink communication timeslot.

Figure 10:
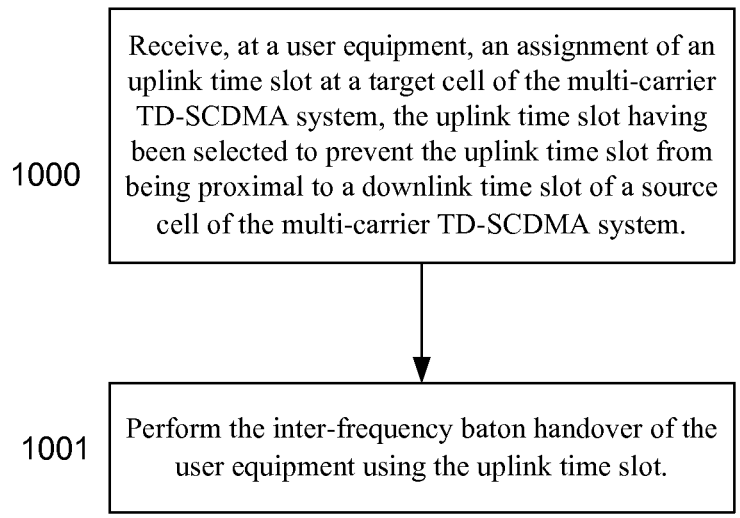
FIG. 10 is a functional block diagram illustrating example blocks executed to implement one aspect of the present teachings.

FIG. 10 is a functional block diagram illustrating example blocks executed to implement one aspect of the present teachings. In block 1000, an assignment of an uplink time slot at a target cell of a multi-carrier TD-SCDMA system is received at a user equipment. The uplink time slot is selected to prevent the uplink time slot from being proximal to a downlink time slot of a source cell of the multi-carrier TD-SCDMA system. Inter-frequency baton handover of the user equipment is performed, in block 1001, using the uplink time slot.

In one configuration, the user equipment 350 for wireless communication includes means for performing a hard handover of a user equipment within a source cell of the multi-carrier TD-SCDMA system from a first frequency to a second frequency and means for performing a baton handover of the user equipment from the second frequency at the source cell to the second frequency at a target cell of the multi-carrier TD-SCDMA system. In one aspect, the aforementioned means may be the antenna 352, the receiver 354, the receive frame processor 360, receive processor 370, the transmitter 356, the transmit frame processor 382, the transmit processor 382, the handover module 393, and the controller/processor 390 configured to perform the functions recited by the aforementioned means. In another aspect, the aforementioned means may be a module or any apparatus configured to perform the functions recited by the aforementioned means.

In another configuration, the user equipment 350 for wireless communication includes means for receiving, at the user equipment 350, an assignment of an uplink time slot at a target cell of the multi-carrier TD-SCDMA system, the uplink time slot having been selected to prevent the uplink time slot from being proximal to a downlink time slot of a source cell of the multi-carrier TD-SCDMA system and means for performing the inter-frequency baton handover of the user equipment using the uplink time slot. In one aspect, the aforementioned means may be the antenna 352, the receiver 354, the receive frame processor 360, receive processor 370, and the controller/processor 390 configured to perform the functions recited by the aforementioned means. In another aspect, the aforementioned means may be a module or any apparatus configured to perform the functions recited by the aforementioned means.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, high speed downlink packet access (HSDPA), high speed uplink packet access (HSUPA), high speed packet access plus (HSPA+) and TD-CDMA. Various aspects may also be extended to systems employing long term evolution (LTE) (in FDD, TDD, or both modes), LTE-advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform. For example, the handover module 343 stored on the memory 342 of the Node B 310, or the handover module 393 stored on the memory 392 of the UE 350, includes program logic which may be executed by the controller/processor 340 to perform the handover functionalities described herein.

It should be noted that in the aspects of the present teachings in which a two-step process for the baton handover are implemented, the handover modules 343 and 393 include program code and software logic functions that enable this two-step handover functionality. While in alternative aspects of the present teachings where baton handover in multi-carrier systems is implemented by selecting communication timeslots that are not adjacent to one another, the handover modules 343 and 393 include program code and software logic functions that enable this special timeslot analysis and selection functionality.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for implementing a multiple step inter-frequency handover procedure for a user equipment from a source cell to a target cell in a multi-carrier time division-synchronous code division multiple access (TD-SCDMA) system, comprising:

receiving an indication for handover from a first frequency during communication on the source cell to a second frequency to communicate with the target cell; and determining whether a downlink time slot for communicating on the first frequency with the source cell is adjacent to an uplink time slot for communicating on the second frequency with the target cell, and subsequent to the determining that the downlink time slot is adjacent to the uplink time slot:

receiving an assignment for a new uplink time slot for the target cell of the multi-carrier TD-SCDMA system, the new uplink time slot selected to prevent the new uplink time slot from being adjacent to the downlink time slot of the source cell, performing a hard handover of said user equipment within the source cell of said multi-carrier TD-SCDMA system from the first frequency to the second frequency in response to the indication for handover from the first frequency during communication with the source cell to the second frequency to communicate with the target cell, and subsequent to performing the hard handover, performing a baton handover of said user equipment from said second frequency at said source cell to said second frequency at the target cell of said multi-carrier TD-SCDMA system.

2. The method of claim 1 further comprising:
receiving a first handover command message from said source cell, said first handover command message directing said user equipment to perform said hard handover; and
transmitting a hard handover completion message to said source cell in response to successful completion of said hard handover.

3. The method of claim 2 further comprising:
receiving a second handover command message from said source cell, said second handover command message directing said user equipment to begin said baton handover to said target cell using said second frequency; and
transmitting a baton handover completion message to said target cell in response to successful completion of said baton handover.

4. A user equipment for implementing a multiple step inter-frequency handover procedure from a source cell to a target cell in a multi-carrier time division-synchronous code division multiple access (TD-SCDMA) system, comprising:
means for receiving an indication for handover from a first frequency during communication on the source cell to a second frequency to communicate with the target cell; and
means for determining whether a downlink time slot for communicating on the first frequency with the source cell is adjacent to an uplink time slot for communicating on the second frequency with the target cell:
means for receiving, subsequent to the determining that the downlink time slot is adjacent to the uplink time slot, an assignment for a new uplink time slot for the target cell of the multi-carrier TD-SCDMA system, the new uplink time slot selected to prevent the new uplink time slot from being adjacent to the downlink time slot of the source cell;
means for performing, subsequent to receiving the new uplink time slot, a hard handover within the source cell of said multi-carrier TD-SCDMA system from the first frequency to the second frequency in response to the indication for handover from the first frequency during communication with the source cell to the second frequency to communicate with the target cell, and
means for performing, after the hard handover, a baton handover from said second frequency at said source cell to said second frequency at the target cell of said multi-carrier TD-SCDMA system, in response to the hard handover.

5. The user equipment of claim 4 further comprising:
means for receiving a first handover command message from said source cell, said first handover command message directing said user equipment to perform said hard handover; and
means for transmitting a hard handover completion message to said source cell in response to successful completion of said hard handover.

6. The user equipment of claim 5 further comprising:
means for receiving a second handover command message from said source cell, said second handover command message directing said user equipment to begin said baton handover to said target cell using said second frequency; and
means for transmitting a baton handover completion message to said target cell in response to successful completion of said baton handover.

7. A computer program product, comprising:
a non-transitory computer-readable medium having computer code recorded thereon, said computer code comprising code:
that receives an indication for handover from a first frequency during communication on a source cell to a second frequency to communicate with a target cell; and
that determines whether a downlink time slot for communicating on the first frequency with the source cell is adjacent to an uplink time slot for communicating on the second frequency with the target cell, and subsequent to determining that the downlink time slot is adjacent to the uplink time slot the computer code further comprises code:
that receives an assignment for a new uplink time slot for the target cell of the multi-carrier TD-SCDMA system, the new uplink time slot selected to prevent the new uplink time slot from being adjacent to the downlink time slot of the source cell,
that performs a hard handover of a user equipment within the source cell of a multi-carrier time division-synchronous code division multiple access (TD-SCDMA) system from the first frequency of the source cell to the second frequency in response to the indication for handover from the first frequency during communication with the source cell to the second frequency to communicate with the target cell, and
that performs, subsequent to performing the hard handover, a baton handover of said user equipment from said second frequency at said source cell to said second frequency at the target cell of said multi-carrier TD-SCDMA system as a second step of the inter-frequency handover procedure.

8. The computer program product of claim 7 wherein said computer code further comprises code:
that receives a first handover command message from said source cell, said first handover command message directing said user equipment to perform said hard handover; and
that transmits a hard handover completion message to said source cell in response to successful completion of said hard handover.

9. The computer program product of claim 8 wherein said computer code further comprises code:
that receives a second handover command message from said source cell, said second handover command message directing said user equipment to begin said baton handover to said target cell using said second frequency; and
that transmits a baton handover completion message to said target cell in response to successful completion of said baton handover.

10. A user equipment for wireless communication in a multi-carrier time division-synchronous code division multiple access (TD-SCDMA) system, said user equipment comprising:
at least one processor; and
a memory coupled to said at least one processor,
wherein said at least one processor is configured:
to receive an indication for handover from a first frequency during communication on a source cell to a second frequency to communicate with a target cell; and
to determine whether a downlink time slot for communicating on the first frequency with the source cell is adjacent to an uplink time slot for communicating on the second frequency with the target cell, and subsequent to determining that the downlink time slot is adjacent to the uplink time slot:
    to receive an assignment for a new uplink time slot for the target cell of the multi-carrier TD-SCDMA system, the new uplink time slot selected to prevent the new uplink time slot from being adjacent to the downlink time slot of the source cell,
    to perform a hard handover within the source cell of said multi-carrier TD-SCDMA system from the first frequency to the second frequency in response to the indication for handover from the first frequency during communication with the source cell to the second frequency to communicate with the target cell, and
    to perform, subsequent to performing the hard handover, a baton handover from said second frequency at said source cell to said second frequency at the target cell of said multi-carrier TD-SCDMA system.

11. The user equipment of claim 10 wherein said at least one processor is further configured:
    to receive a first handover command message from said source cell, said first handover command message directing said user equipment to perform said hard handover; and
    to transmit a hard handover completion message to said source cell in response to successful completion of said hard handover.

12. The user equipment of claim 11 wherein said at least one processor is further configured:
    to receive a second handover command message from said source cell, said second handover command message directing said user equipment to begin said baton handover to said target cell using said second frequency; and
    to transmit a baton handover completion message to said target cell in response to successful completion of said baton handover.

13. A method for implementing an inter-frequency baton handover in a multi-carrier time division-synchronous code division multiple access (TD-SCDMA) system, comprising:
    receiving an indication for inter-frequency baton handover from a first frequency during communication on a source cell to a second frequency to communicate with a target cell; and
    determining that a downlink time slot for communicating on the first frequency with the source cell is adjacent to an uplink time slot for communicating on the second frequency with the target cell, and subsequent to the determining that the downlink time slot is adjacent to the uplink time slot:
        receiving, at a user equipment, an assignment of a new uplink time slot for communicating with the target cell of said multi-carrier TD-SCDMA system,
        determining said new uplink time slot is not adjacent to the downlink time slot of the source cell of said multi-carrier TD-SCDMA system, said new uplink time slot being assigned in response to the indication for the inter-frequency baton handover, and
        performing said inter-frequency baton handover of said user equipment using said new uplink time slot.

14. The method of claim 13 wherein said assignment is received from a Node B of said multi-carrier TD-SCDMA, said Node B configured to analyze proposed uplink and downlink time slots scheduled for a proposed handover and to select said new uplink time slot for said assignment when said proposed uplink and downlink time slots are not adjacent to each other.

15. The method of claim 13 further comprising:
    transmitting a handover completion message to said target cell in response to successful completion of said inter-frequency baton handover.

16. A user equipment in a multi-carrier time division-synchronous code division multiple access (TD-SCDMA) system, comprising:
    means for receiving an indication for inter-frequency baton handover from a first frequency during communication on a source cell to a second frequency to communicate with a target cell; and
    means for determining that a downlink time slot for communicating on the first frequency with the source cell is adjacent to an uplink time slot for communicating on the second frequency with the target cell, and subsequent to the determining that the downlink time slot is adjacent to the uplink time slot:
        means, executable by said user equipment, for receiving an assignment of a new uplink time slot for communicating with the target cell of said multi-carrier TD-SCDMA system,
        means for determining said new uplink time slot is not adjacent to the downlink time slot of the source cell of said multi-carrier TD-SCDMA system, said uplink time slot being assigned in response to the indication for the inter-frequency baton handover, and
        means for performing an inter-frequency baton handover of said user equipment using said new uplink time slot.

17. The user equipment of claim 16 wherein said assignment is received from a Node B of said multi-carrier TD-SCDMA, said Node B configured to analyze proposed uplink and downlink time slots scheduled for a proposed handover and to select said new uplink time slot for said assignment when said proposed uplink and downlink time slots are not adjacent to each other.

18. The user equipment of claim 16 further comprising:
    means for transmitting a handover completion message to said target cell in response to successful completion of said inter-frequency baton handover.

19. A computer program product comprising:
    a non-transitory computer-readable medium having computer code recorded thereon, said computer code comprising code:
        that receives an indication for inter-frequency baton handover from a first frequency during communication on the source cell to a second frequency to communicate with the target cell; and
        that determines that a downlink time slot for communicating on the first frequency with the source cell is adjacent to an uplink time slot for communicating on the second frequency with the target cell, and subsequent to the determining that the downlink time slot is adjacent to the uplink time slot, the computer code further comprises code:
            that receives, at a user equipment, an assignment of a new uplink time slot for communicating with the target cell of said multi-carrier TD-SCDMA system,
            that determines said new uplink time slot is not adjacent to the downlink time slot of the source cell of said multi-carrier TD-SCDMA system, said uplink time slot being assigned in response to the indication for the inter-frequency baton handover, and that performs an inter-frequency baton handover of said user equipment using said new uplink time slot.

20. The computer program product of claim 19 wherein said assignment is received from a Node B of said multi-carrier TD-SCDMA, said Node B configured to analyze proposed uplink and downlink time slots scheduled for a proposed handover and to select said new uplink time slot for said assignment when said proposed uplink and downlink time slots not are adjacent to each other.

21. The computer program product of claim 19 wherein said computer code further comprises code:
that transmits a handover completion message to said target cell in response to successful completion of said inter-frequency baton handover.

22. A user equipment for wireless communication in a multi-carrier time division-synchronous code division multiple access (TD-SCDMA) system, said user equipment comprising:
at least one processor; and
a memory coupled to said at least one processor,
wherein said at least one processor is configured:
to receive an indication for inter-frequency baton handover from a first frequency during communication on a source cell to a second frequency to communicate with a target cell; and
to determine that a downlink time slot for communicating on the first frequency with the source cell is adjacent to an uplink time slot for communicating on the second frequency with the target cell, and subsequent to the determining that the downlink time slot is adjacent to the uplink time slot:
to receive, at said user equipment, an assignment of a new uplink time slot for communicating with the target cell of said multi-carrier TD-SCDMA system,
to determine said new uplink time slot is not adjacent to the downlink time slot of the source cell of said multi-carrier TD-SCDMA system, said uplink time slot being assigned in response to the indication for the inter-frequency baton handover, and
to perform an inter-frequency baton handover of said user equipment using said new uplink time slot.

23. The user equipment of claim 22 wherein said assignment is received from a Node B of said multi-carrier TD-SCDMA, said Node B configured to analyze proposed uplink and downlink time slots scheduled for a proposed handover and to select said new uplink time slot for said assignment when said proposed uplink and downlink time slots are not adjacent to each other.

24. The user equipment of claim 22 wherein said at least one processor is further configured to transmit a handover completion message to said target cell in response to successful completion of said inter-frequency baton handover.

25. A method for implementing a multiple step inter-frequency handover procedure for a user equipment (UE) from a source cell to a target cell in a multi-carrier time division-synchronous code division multiple access (TD-SCDMA) system, comprising:
receiving an indication that a downlink time slot for communicating on a first frequency between the source cell and the UE is adjacent to an uplink time slot for communicating on a second frequency between the target cell and the UE;
receiving an assignment for a new uplink time slot at the target cell of the multi-carrier TD-SCDMA system, the new uplink time slot selected to prevent the new uplink time slot from being adjacent to the downlink time slot of the source cell, the assignment received subsequent to the indication;
transmitting a first handover command message from the source cell to the UE in response to an indication for inter-frequency handover from the first frequency of the source cell to the second frequency of the target cell, the first handover command message directing the UE to perform a hard handover from the first frequency of the source cell to the second frequency of the source cell;
receiving a hard handover completion message from the UE in response to successful completion of the hard handover, the hard handover performed subsequent to the indication that the downlink time slot is adjacent to the uplink time slot; and
transmitting a second handover command message from the source cell to the UE in response to the indication for inter-frequency handover from the first frequency of the source cell to the second frequency of the target cell, the second handover command message directing the UE to begin a baton handover from the source cell to the target cell using the second frequency.

26. An apparatus for implementing a multiple step inter-frequency handover procedure for a user equipment (UE) from a source cell to a target cell in a multi-carrier time division-synchronous code division multiple access (TD-SCDMA) system, comprising:
means for receiving an indication that a downlink time slot for communicating on a first frequency between the source cell and the UE is adjacent to an uplink time slot for communicating on a second frequency between the target cell and the UE;
means for receiving an assignment for a new uplink time slot at the target cell of the multi-carrier TD-SCDMA system, the new uplink time slot selected to prevent the new uplink time slot from being adjacent to the downlink time slot of the source cell, the assignment received subsequent to the indication;
means for transmitting a first handover command message from the source cell to the UE in response to an indication for inter-frequency handover from the first frequency of the source cell to the second frequency of the target cell, the first handover command message directing the UE to perform a hard handover from a first frequency of the source cell to the second frequency of the source cell;
means for receiving a hard handover completion message from the UE in response to successful completion of the hard handover, the hard handover performed subsequent to the indication that the downlink time slot is adjacent to the uplink time slot; and
means for transmitting a second handover command message from the source cell to the UE in response to an indication for inter-frequency handover from the first frequency of the source cell to the second frequency of the target cell, the second handover command message directing the UE to begin a baton handover from the source cell to the target cell using the second frequency.

27. A computer program product, comprising:
a non-transitory computer-readable medium having computer code recorded thereon, the computer code comprising code:
that receives an indication that a downlink time slot for communicating on a first frequency between a source cell and the UE is adjacent to an uplink time slot for communicating on a second frequency between a target cell and the UE;

that receives an assignment for a new uplink time slot at the target cell of the multi-carrier TD-SCDMA system, the new uplink time slot selected to prevent the new uplink time slot from being adjacent to the downlink time slot of the source cell, the assignment received subsequent to the indication;

that transmits a first handover command message from a source cell to the UE in response to an indication for inter-frequency handover from the first frequency of the source cell to the second frequency of the target cell, the first handover command message directing the UE to perform a hard handover from a first frequency of the source cell to the second frequency of the source cell;

that receives a hard handover completion message from the UE in response to successful completion of the hard handover, the hard handover performed subsequent to the indication that the downlink time slot is adjacent to the uplink time slot; and that transmits a second handover command message from the source cell to the UE in response to an indication for inter-frequency handover from the first frequency of the source cell to the second frequency of the target cell, the second handover command message directing the UE to begin a baton handover from the source cell to the target cell using the second frequency.

28. A base station for wireless communication in a multi-carrier time division-synchronous code division multiple access (TD-SCDMA) system, the base station comprising:
 a memory; and
 at least one processor coupled to the memory and configured:

to receive an indication that a downlink time slot for communicating on a first frequency between a source cell and the UE is adjacent to an uplink time slot for communicating on a second frequency between a target cell and the UE;

to receive an assignment for a new uplink time slot at the target cell of the multi-carrier TD-SCDMA system, the new uplink time slot selected to prevent the new uplink time slot from being adjacent to the downlink time slot of the source cell, the assignment received subsequent to the indication;

to transmit a first handover command message from the base station to the UE in response to an indication for inter-frequency handover from the first frequency of the source cell to the second frequency of the target cell, the first handover command message directing the UE to perform a hard handover from a first frequency of the base station to the second frequency of the base station;

to receive a hard handover completion message from the UE in response to successful completion of the hard handover, the hard handover performed subsequent to the indication that the downlink time slot is adjacent to the uplink time slot; and to transmit a second handover command message from the base station to the UE in response to an indication for inter-frequency handover from the first frequency of the source cell to the second frequency of the target cell, the second handover command message directing the UE to begin a baton handover from the base station to a target cell using the second frequency.

\* \* \* \* \*